US012220377B2

(12) United States Patent
Yen et al.

(10) Patent No.: US 12,220,377 B2
(45) Date of Patent: Feb. 11, 2025

(54) PORTABLE GUIDANCE DEVICE FOR CARDIOPULMONARY RESUSCITATION AND THE USE THEREOF

(71) Applicants: NATIONAL TAIWAN UNIVERSITY HOSPITAL, Taipei (TW); FINE-I LTD., Taipei (TW)

(72) Inventors: Ting An Yen, Taipei (TW); Ching Chia Wang, Taipei (TW); Hwa Chang Wang, New Taipei (TW)

(73) Assignees: NATIONAL TAIWAN UNIVERSITY HOSPITAL, Taipei (TW); FINE-I LTD., Taipei (TW)

( * ) Notice: Subject to any disclaimer, the term of this patent is extended or adjusted under 35 U.S.C. 154(b) by 820 days.

(21) Appl. No.: 17/413,461

(22) PCT Filed: Dec. 13, 2019

(86) PCT No.: PCT/CN2019/125033

§ 371 (c)(1),
(2) Date: Jun. 11, 2021

(87) PCT Pub. No.: WO2020/119776

PCT Pub. Date: Jun. 18, 2020

(65) Prior Publication Data

US 2022/0087899 A1 Mar. 24, 2022

Related U.S. Application Data

(60) Provisional application No. 62/779,466, filed on Dec. 13, 2018.

(51) Int. Cl.
*A61H 31/00* (2006.01)

(52) U.S. Cl.
CPC ......... *A61H 31/005* (2013.01); *A61H 31/007* (2013.01); *A61H 2201/0157* (2013.01);
(Continued)

(58) Field of Classification Search
CPC .... A61H 31/00; A61H 31/005; A61H 31/007; A61H 2201/0157; A61H 2201/5048; A61H 2201/5058; A61H 2201/5071
See application file for complete search history.

(56) References Cited

U.S. PATENT DOCUMENTS

| | | | | |
|---|---|---|---|---|
| 8,942,800 | B2 * | 1/2015 | Thiagrajan | A61N 1/3993 607/3 |
| 9,119,767 | B2 * | 9/2015 | Wood | A61H 31/007 |

(Continued)

FOREIGN PATENT DOCUMENTS

| | | | |
|---|---|---|---|
| CN | 104799826 | A | 7/2015 |
| CN | 105877990 | A | 8/2016 |

(Continued)

*Primary Examiner* — Margaret M Luarca
*Assistant Examiner* — Sarah B Lederer
(74) *Attorney, Agent, or Firm* — Muncy, Geissler, Olds & Lowe, P.C.

(57) ABSTRACT

The present invention provides a portable guidance device for cardiopulmonary resuscitation, which comprises a tri-axial gravity sensing element, a pressure sensing element, a sound output element, a visual output element and a micro-controller. The portable guidance device for cardiopulmonary resuscitation can actively connect to the medical rescue system and issue an alarm to guide the surrounding passers-by to perform real-time rescue and perform correct cardio-pulmonary resuscitation, so as to improve the efficiency and accuracy of chest compressions.

14 Claims, 4 Drawing Sheets

(52) U.S. Cl.
CPC ................ *A61H 2201/5023* (2013.01); *A61H 2201/5048* (2013.01); *A61H 2201/5058* (2013.01); *A61H 2201/5071* (2013.01); *A61H 2201/5082* (2013.01)

(56) References Cited

U.S. PATENT DOCUMENTS

| | | | | |
|---|---|---|---|---|
| 2002/0177793 | A1* | 11/2002 | Sherman .............. | A61H 31/006<br>601/41 |
| 2004/0082888 | A1* | 4/2004 | Palazzolo ............ | A61B 5/7242<br>601/41 |
| 2008/0146973 | A1 | 6/2008 | Lund et al. | |
| 2008/0300518 | A1* | 12/2008 | Bowes ................. | A61H 31/007<br>601/41 |
| 2010/0256539 | A1* | 10/2010 | Strand ............... | A61M 15/0086<br>600/534 |
| 2013/0085551 | A1* | 4/2013 | Bachinski .......... | A61N 1/36034<br>607/59 |
| 2014/0135666 | A1 | 5/2014 | Butler et al. | |
| 2017/0079537 | A1* | 3/2017 | McEwen .............. | A61B 5/6828 |

FOREIGN PATENT DOCUMENTS

| | | | | | |
|---|---|---|---|---|---|
| CN | 106619038 | A | | 5/2017 | |
| CN | 108785051 | A | | 11/2018 | |
| CN | 108969338 | A | * | 12/2018 | |
| WO | WO-2018160709 | A1 | * | 9/2018 | ........... A61H 31/005 |

* cited by examiner

PORTABLE GUIDANCE DEVICE FOR CARDIOPULMONARY RESUSCITATION AND THE USE THEREOF

CROSS-REFERENCE TO RELATED APPLICATION

This application claims priority of U.S. provisional application No. 62/779,466, filed on Dec. 13, 2018, the content of which are incorporated herein in its entirety by reference.

BACKGROUND OF THE INVENTION

1. Field of the Invention

The invention relates to a portable guidance device for cardiopulmonary resuscitation, and more particularly to a portable guidance device for cardiopulmonary resuscitation which can actively detect the wearer's action state and guide the correct cardiopulmonary resuscitation procedure, and can be suitable for wearers of any body shapes.

2. The Prior Art

Sudden death refers to unexpected sudden death caused by various reasons. It is the most critical and dangerous clinical situation. It is manifested as respiratory and cardiac arrest and the main reason is sudden cardiac death. Sudden cardiac death ranks among the top causes of death, and there is a trend of increasing year by year. Cardiopulmonary resuscitation (CPR) is a first aid measure to rescue patients with cardiac arrest. Brain function is maintained by external artificial means until the patient can breathe spontaneously and restore blood circulation. Cardiopulmonary resuscitation is not a single technique, and it involves a series of assessments and actions, including chest compressions and artificial respiration.

Once a cardiac arrest occurs, if the patient cannot be resuscitated in time, it will cause irreversible damage to the brain and other important organs and tissues after four to six minutes. The oxygen contained in the lungs and the blood can still maintain its supply within four minutes, so a rapid first aid in four minutes and a good quality of CPR operation will protect the brain cells from damage and fully recover. Between four and six minutes, depending on the situation, the brain cells may be damaged. More than six minutes, there will be varying degrees of damage, and delaying for more than ten minutes will definitely cause brain cells to die due to hypoxia. Therefore, cardiopulmonary resuscitation after cardiac arrest must be performed immediately on the spot.

However, the necessary equipment and the lack of knowledge of first aid for cardiac arrest and ventricular fibrillation may lead to a reduction in the success rate of rescue of sudden cardiac death. Incorrect position, frequency and depth of chest compressions during cardiopulmonary resuscitation will not only reduce the effects of chest compressions, but also lead to complications such as sternal fracture, rib fracture, pericardial effusion, pericardial effusion, tension pneumothorax, and pleural effusion.

In addition, with the development of medical treatment, Taiwan is moving towards an aging society, and the care of the elderly is relatively more and more important. The elderly is often unable to act autonomously after falls, resulting in delays in medical treatment.

In summary, it is necessary to develop a device that can autonomously detect the patient's fall status, actively connect to the medical rescue system, and guide the passers-by to provide real-time and correct rescue, especially for cardiopulmonary resuscitation.

SUMMARY OF THE INVENTION

Therefore, one objective of the present invention is to provide a portable guidance device for cardiopulmonary resuscitation, comprising: a tri-axial gravity sensing element, which is worn on an individual to detect the tri-axial action state of the individual and output a gravity sensing signal; a pressure sensing element, sensing a pressing force and outputting a pressure sensing signal; a sound output element, generating a speech; a visual output element, generating a pressing depth indication or a pressing strength indication; and a microcontroller, receiving the gravity sensing signal and the pressure sensing signal; wherein, the microcontroller determines whether the individual has fallen based on the gravity sensing signal, and the microcontroller causes the sound output element to generate the speech for indicating a procedure of cardiopulmonary resuscitation; wherein, the microcontroller determines whether the pressing force matches a pressing setting based on the gravity sensing signal and the pressure sensing signal, and the microcontroller causes the visual output element response to the pressing force to generate the pressing depth indication or the pressing strength indication, and causes the sound output element response to the pressing force to generate a speech indication to meet the pressing setting in the procedure of the cardiopulmonary resuscitation.

In one embodiment of the present invention, the pressing setting comprising: a pressing depth setting value, a pressing strength setting value, and a pressing frequency setting value.

In one embodiment of the present invention, in the procedure of the cardiopulmonary resuscitation, the tri-axial gravity sensing element only retains the gravity sensing signal of the vertical axis defined as the Z axis, to detect a pressing depth and generate a pressing depth sensing signal, which is received by the microcontroller and used to determine whether the pressing depth meets the pressing depth setting value.

In one embodiment of the present invention, the sound output element generates the speech to indicate a decrease in the pressing depth, and the visual output element generates the pressing depth indication of the cardiopulmonary resuscitation when the pressing depth sensing signal is greater than the pressing depth setting value, so that the pressing depth meets the pressing depth setting value; and the sound output element generates the speech to indicate an increase in the pressing depth, and the visual output element generates the pressing depth indication of the cardiopulmonary resuscitation when the pressing depth sensing signal is lower than the pressing depth setting value, so that the pressing depth meets the pressing depth setting value.

In one embodiment of the present invention, the microcontroller further comprises an analog-to-digital converter (ADC), and the analog-to-digital converter converts the pressing depth sensing signal and the pressure sensing signal into an analog-digital value, respectively, and integrates and calibrate the two analog-digital values to generate a pressing strength setting value suitable for the individual, and at the same time turns off the tri-axial gravity sensing element when the pressing depth meets the pressing depth setting value.

In one embodiment of the present invention, the sound output element generates the speech to indicate a decrease in the pressing force, and the visual output element generates the pressing strength indication of the cardiopulmonary resuscitation when the pressing force is greater than the pressing strength setting value, so that the pressing force meets the pressing strength setting value; and the sound output element generates the speech to indicate an increase in the pressing force, and the visual output element generates the pressing strength indication of the cardiopulmonary resuscitation when the pressing force is lower than the pressing strength setting value, so that the pressing force meets the pressing strength setting value.

In one embodiment of the present invention, the pressure sensing element further comprises a metronome to detect the pressing frequency and generate a pressing frequency sensing signal, which is received by the microcontroller and used to determine whether the pressing frequency meets the pressing frequency setting value.

In one embodiment of the present invention, the sound output element generates the speech to indicate a decrease in the pressing frequency, and the visual output element generates the pressing frequency indication of the cardiopulmonary resuscitation when the pressing frequency is greater than the pressing frequency setting value, so that the pressing frequency meets the pressing frequency setting value; and the sound output element generates the speech to indicate an increase in the pressing frequency, and the visual output element generates the pressing frequency indication of the cardiopulmonary resuscitation when the pressing frequency is lower than the pressing frequency setting value, so that the pressing frequency meets the pressing frequency setting value.

In one embodiment of the present invention, the tri-axial gravity sensing element is a gravity sensor (G-sensor); the pressure sensing element is a pressure sensor, and the pressure sensor is a piezoelectric transducer.

In one embodiment of the present invention, the pressing depth setting value is five to six centimeters, and the pressing frequency setting value is 100 to 120 times per minute.

In one embodiment of the present invention, the pressure sensing element further comprises a variable resistor for calibrating and fine-tuning an error which occurs when the pressing force is converted into the pressure sensing signal.

In one embodiment of the present invention, the sound output element includes a speech generator, a loudspeaker, and a broadcaster; and the visual output element is a combination of light emitting diodes (LED).

In one embodiment of the present invention, the portable guidance device for cardiopulmonary resuscitation further comprises a power supply, and the power supply includes a charging port, a lithium charger, a lithium battery, and a power button, and the lithium battery further comprises a temperature sensor (negative temperature coefficient, NTC); wherein, the negative temperature coefficient is used to detect whether the battery is charged at a safe temperature.

In one embodiment of the present invention, the portable guidance device for cardiopulmonary resuscitation further comprises a pressing plate cover, an upper plate cover, a main circuit board and a lower plate cover, wherein the sound output element and the visual output element are located in the main circuit board, and the pressing plate cover has a positioning frame.

The other objective of the present invention is to provide guidance method for cardiopulmonary resuscitation, which uses a portable guidance device for cardiopulmonary resuscitation, which comprising: a tri-axial gravity sensing element, a pressure sensing element and a sound output element, and the guidance method comprises steps: causing the sound output element to generate a speech to guide a procedure of cardiopulmonary resuscitation when a fall occurring in an individual wearing the portable guidance device for cardiopulmonary resuscitation is determined based on a gravity sensing signal of the tri-axial gravity sensing element, and the procedure of cardiopulmonary resuscitation includes placing the portable guidance device for cardiopulmonary resuscitation on the chest of the individual lying flat, and applying a pressing force on the portable guidance device for cardiopulmonary resuscitation; determining whether the pressing force meets a pressing depth setting value based on the gravity sensing signal, and then the sound output element generates a speech to indicate the pressing depth indication, so that the pressing force meets the pressing depth setting value.

Determining whether the pressing force meets a pressing strength setting value based on a pressure sensing signal of the pressure sensing element, and then the sound output element generates a speech to indicate the pressing strength indication, so that the pressing force meets the pressing strength setting value; and determining whether a frequency of the pressing force meets the pressing frequency setting value based on a pressing frequency sensing signal of the pressure sensing element, and then the sound output element generates a speech to indicate the pressing frequency indication, so that the frequency of the pressing force meets the pressing frequency setting value.

The portable guidance device for cardiopulmonary resuscitation of the present invention can detect the action state of the wearer (i.e. the person who needs to be rescued); and when the action state of a fall occurs, or when the wearer faints or goes into shock, the portable guidance device for cardiopulmonary resuscitation actively sends out an alarm for help to the surround to prompt others to rescue the wearer, and at the same time connects to notify the remote rescue system; the portable guidance device for cardiopulmonary resuscitation of the present invention comprises a pressure sensing element to detect whether the pressing frequency and the pressing force of chest compressions are appropriate, it also cooperates with a tri-axial gravity sensing element to detect a pressing depth of chest compressions, and the two kinds of values are calibrated by a microcontroller with an analog-to-digital converter to generate pressing strength setting values suitable for wearers of different body shapes. Thus, in addition to increasing the accuracy of chest compressions in cardiopulmonary resuscitation, the portable guidance device for cardiopulmonary resuscitation of the present invention can be automatically adjusted to a mode suitable for different wearers without manual evaluation and adjustment of the parameter setting in the system. Besides, the portable guidance device for cardiopulmonary resuscitation of the present invention uses direct speech indication and visual indication to improve the efficiency and accuracy of chest compressions performed by the rescuer.

Therefore, the portable guidance device for cardiopulmonary resuscitation of the present invention can be used for home care after legal retailing and provide eligible people, families or units for rent, and can be cooperated with relevant acute care policies and comprehensive care plans, etc., and cooperate with local rehabilitation hospitals and clinics, and cooperate with community rehabilitation, home health care and technical care institutions to provide patients in need.

The embodiments of the present invention are further described with the following drawings. The following embodiments are given to illustrate the present invention and are not intended to limit the scope of the present invention, and those having ordinary skill in the art can make some modifications and refinements without departing from the spirit and scope of the present invention. Therefore, the scope of the present invention is defined by the scope of the appended claims.

DESCRIPTION OF REFERENCE SIGNS

1: portable guidance device for cardiopulmonary resuscitation; 10: tri-axial gravity sensor; 20: pressure sensor; 30: sound output element; 31: speech generator; 32: loudspeaker; 33: broadcaster; 40: visual output element; 50: microcontroller; 51: analog-to-digital converter; 60: power supply; 61: charging port; 62: lithium charger; 63: lithium battery; 64: power button; 70: low-dropout regulator; 80: pressing plate cover; 90: upper plate cover; 100: main circuit board; 110: lower plate cover.

DETAILED DESCRIPTION OF THE PREFERRED EMBODIMENT

According to the present invention, the operating procedures and parameter conditions of the gravity sensor and/or the tri-axial gravity sensor are within the professional literacy and routine techniques of those having ordinary skill in the art.

According to the present invention, the operating procedures and parameter conditions of the pressure sensor are within the professional literacy and routine techniques of those having ordinary skill in the art.

According to the present invention, the operating procedures and parameter conditions of the piezoelectric transducer are within the professional literacy and routine techniques of those having ordinary skill in the art.

According to the present invention, the operating procedures and parameter conditions of the sound output element and/or the loudspeaker are within the professional literacy and routine techniques of those having ordinary skill in the art.

According to the present invention, the operating procedures and parameter conditions of the visual output element and/or the light emitting diode are within the professional literacy and routine techniques of those having ordinary skill in the art.

According to the present invention, the operating procedures and parameter conditions of the temperature sensor are within the professional literacy and routine techniques of those having ordinary skill in the art.

According to the present invention, the operating procedures and parameter conditions of the variable resistor are within the professional literacy and routine techniques of those having ordinary skill in the art.

Figure 1:
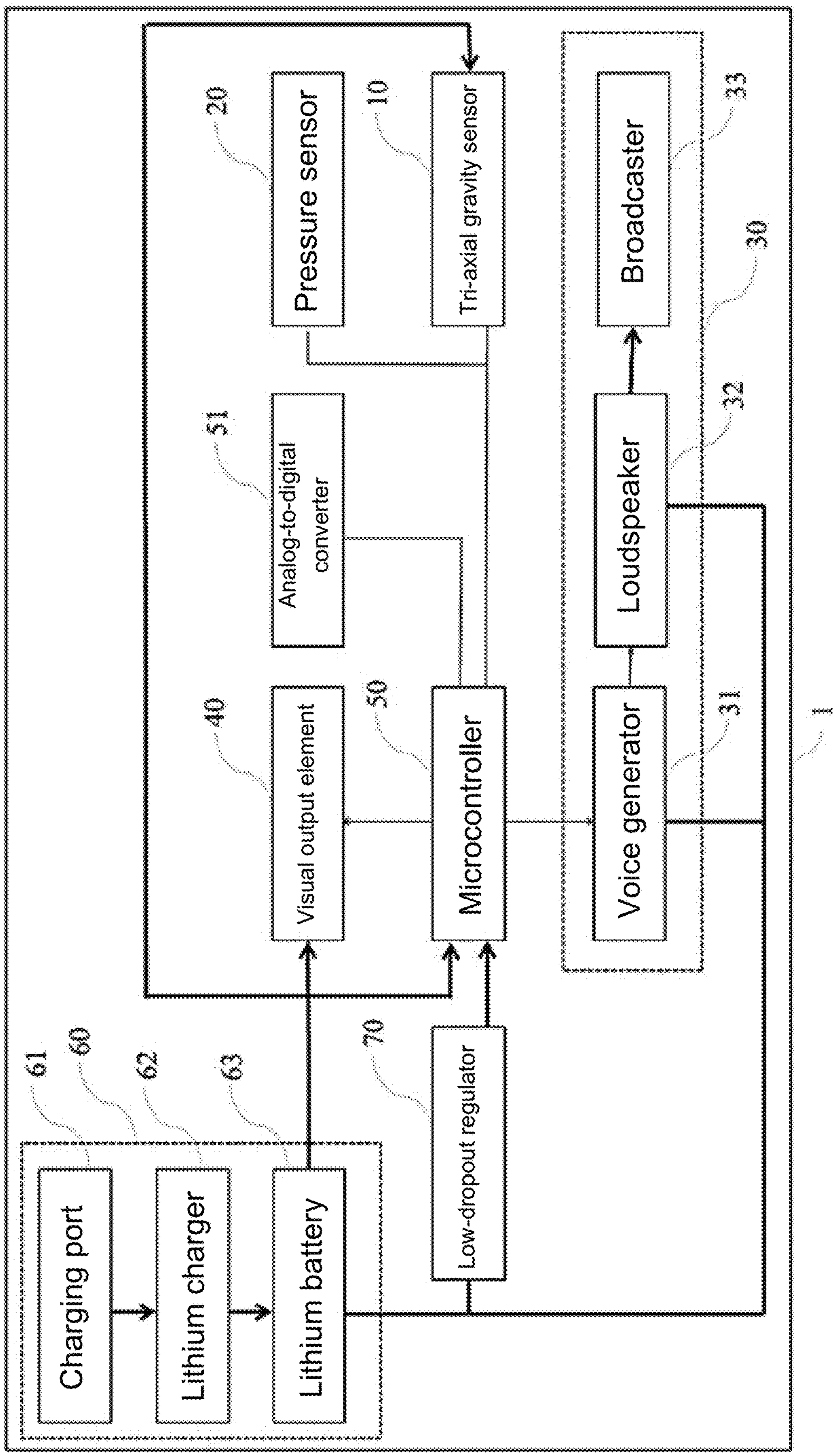
FIG. 1 shows a flow chart of the operation of each element in the portable guidance device for cardiopulmonary resuscitation of the present invention.

Please refer to FIG. 1, which is a flow chart of the operation of each element in the portable guidance device for cardiopulmonary resuscitation of the present invention. The portable guidance device for cardiopulmonary resuscitation 1 of the present invention comprises a tri-axial gravity sensing element 10, a pressure sensing element 20, a sound output element 30, a visual output element 40, a microcontroller 50, a power supply 60, and low-dropout regulator 70 (LDO). Wherein, the tri-axial gravity sensing element 10 further comprises a cloud server (not shown in the figures); the pressure sensing element 20 further comprises a metronome (not shown in the figures), and a variable resistor (not shown in the figures); and the microcontroller 50 further comprises an analog-to-digital converter 51 (ADC); the sound output element 30 further comprises a speech generator 31, a loudspeaker 32, and a broadcaster 33; the power supply 60 further comprises a charging port 61, a lithium charger 62, a lithium battery 63, and a power button 64 (see FIG. 3). Wherein, the metronome is used to detect the pressing frequency and generate a pressing frequency sensing signal, which is received by the microcontroller 50 and used to determine whether the pressing frequency meets the pressing frequency setting value; and the variable resistor is used for calibrating and fine-tuning an error which may occur when the detected pressing force is converted into the pressure sensing signal, so that the portable guidance device for cardiopulmonary resuscitation 1 of the present invention does not need to be calibrated by software or other equipment, and the convenience of the overall portable guidance device for cardiopulmonary resuscitation will increase; the speech generator 31 receives indications from the microcontroller 50, generates a speech, and amplifies the speech volume through the loudspeaker 32, and then outputs the speech through the broadcaster 33; the charging port 61 communicates with the outside of the portable guidance device for cardiopulmonary resuscitation 1 of the present invention, and further comprises a universal serial bus (USB) (not shown in the figures), which is electrically connected to the lithium charger 62 to charge the lithium battery 63, and the lithium battery 63 further comprises a negative temperature coefficient (NTC) (not shown in the figures); the low-dropout regulator 70 is electrically connected to the microcontroller 50 and the power supply 60 respectively to linearly adjust the voltage conducted from the power supply 60 to the microcontroller 50 to provide an accurate and stable voltage without noise.

According to the present invention, the operating procedures and parameter conditions of the low-dropout regulator are within the professional literacy and routine techniques of those having ordinary skill in the art.

According to the present invention, the operating procedures and parameter conditions of the analog-to-digital converter are within the professional literacy and routine techniques of those having ordinary skill in the art.

Figure 2:
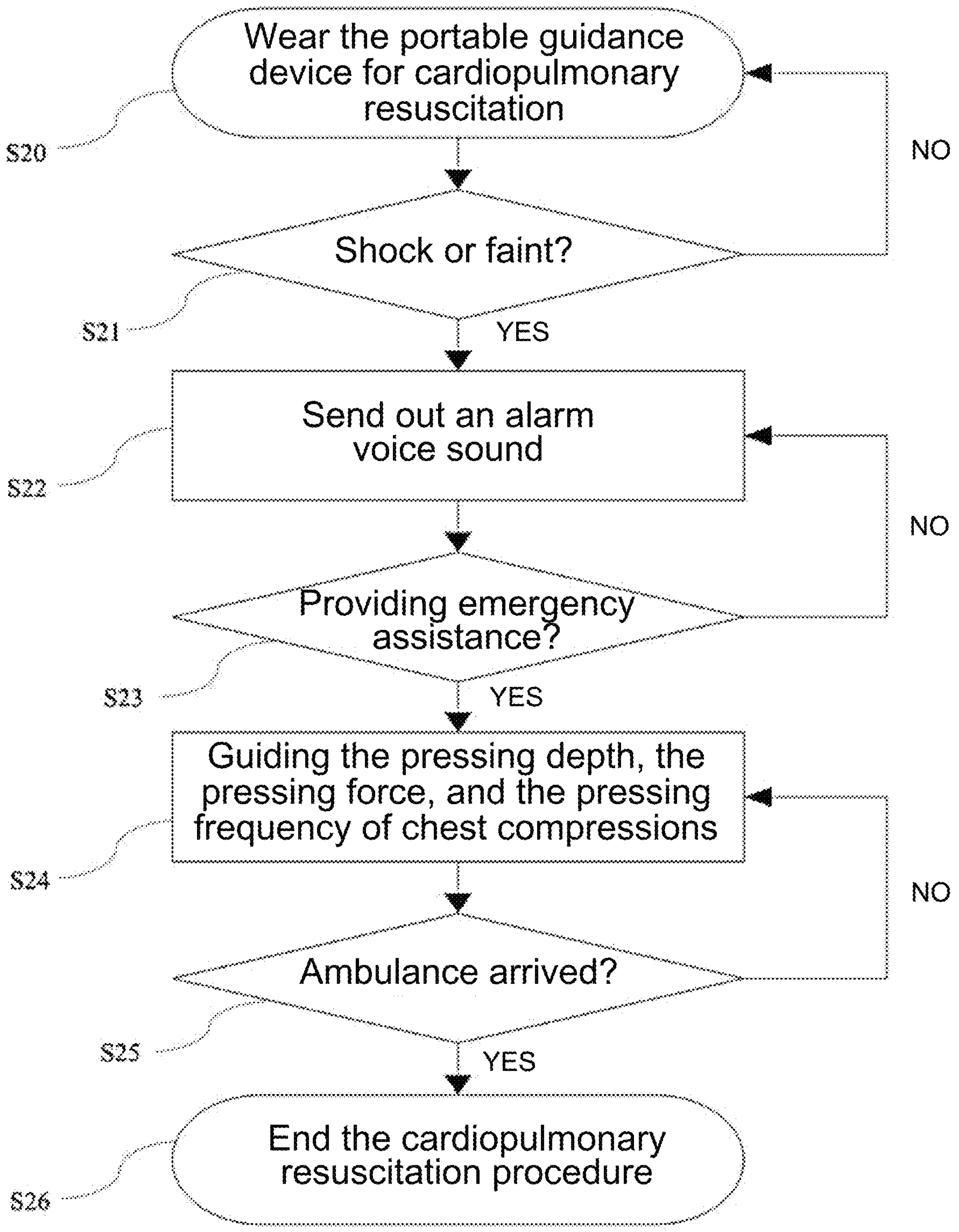
FIG. 2 shows a flow chart of the operation of the portable guidance device for cardiopulmonary resuscitation of the present invention.

Please refer to FIG. 2 for the exampled operation flow chart of using the portable guidance device for cardiopulmonary resuscitation 1 of the present invention in emergency rescue applications. First, an individual who is potentially at risk of falling, shock, or fainting (hereinafter referred to as the rescued person) wears the portable guidance device for cardiopulmonary resuscitation 1 of the present invention (step S20). The tri-axial gravity sensing element 10 will always detect the changes of action states of the rescued person in the X, Y, and Z axis, and continue to feed back the dynamic gravity sensing signal to the microcontroller 50. If the action states of the rescued person in the X, Y, and Z axis are all in a static state for more than ten seconds, the microcontroller 50 will determine that the rescued person has fallen, shocked, or fainted (Step S21), and send out an alarm speech sound through the sound output element 30 (Step S22) to warn surrounding individuals (hereinafter referred to as rescuers) to approach the rescued person and provide emergency assistance, and at the same time, connect and notify the ambulance system through the cloud server to prompt the ambulance to reach the location where the rescued person fell, shocked, or fainted. The tri-axial gravity sensing element 10 can be, but is not limited to, a gravity sensor.

If, in fact, the rescued person does not fall, shock, or faint, pressing the power button 64 in the portable guidance device for cardiopulmonary resuscitation 1 of the present invention and the pressing plate cover 80 at the same time for more than two seconds, the alarm would be cancelled (step S21); if no rescuer approaches the rescued person and provides emergency assistance, the alarm would continue (step S22).

In the procedure of the cardiopulmonary resuscitation, according to the gravity sensing signal and the pressure sensing signal, the microcontroller 50 determines whether the pressing force meets the pressing setting, and causes the visual output element 40 respond to the pressing force to generate the pressing strength indication, and causes the sound output element 30 responds to the pressing force to generate the speech indication to meet the pressing setting. The pressing setting comprises: a pressing depth setting value, a pressing strength setting value, and a pressing frequency setting value.

When the gravity sensing signal is in a static state for a preset time, the microcontroller 50 will determine that the individual has fallen, and the tri-axial gravity sensing element 10 will only retain the gravity sensing signal of the vertical axis, the Z axis, that is, the direction in which the rescuer presses the chest of the rescued person, to detect the pressing depth and generate a pressing depth sensing signal, which is received by the microcontroller 50 and used to determine whether the pressing depth meets the pressing depth setting value. Otherwise, the speech will be issued through the sound output element 30 to indicate the rescuer to perform the correct pressing depth, and the visual output element 40 will generate the pressing depth indication for the cardiopulmonary resuscitation.

The pressure sensing element 20 is used to detect the pressing force and the pressing frequency of the chest compression on the rescued person, and output a pressure sensing signal and a pressing frequency sensing signal; and when the aforementioned pressing depth meets the pressing depth setting value, the analog-to-digital converter 51 converts the pressing depth sensing signal and the pressure sensing signal into an analog-digital value, respectively, and integrates and calibrates the two analog-digital values to generate a pressing strength setting value suitable for the rescued person, so that the portable guidance device for cardiopulmonary resuscitation 1 of the present invention can be suitable for rescued people of any kinds of body shapes; and at the same time, the microcontroller 50 will turn off tri-axial gravity sensor element 10.

When the rescuer continues to perform chest compressions on the rescued person, the pressure sensing element 20 detects whether the pressing force is at the aforementioned pressing force setting value, and detects whether the pressing frequency is also at the aforementioned pressing frequency setting value. Otherwise, the speech will be issued through the sound output element 30 to indicate the rescuer to perform the correct pressing force and pressing frequency; and the visual output element 40 will generate the pressing force indication and pressing frequency indication of the cardiopulmonary resuscitation.

If a rescuer approaches the rescued person and provides emergency assistance, the portable guidance device for cardiopulmonary resuscitation 1 of the present invention will indicate the rescuer to shortly press the power button 64 to make the portable guidance device for cardiopulmonary resuscitation 1 of the present invention generate a speech to indicate the rescuer to perform the procedure of the cardiopulmonary resuscitation for the rescued person; and the detection of the X-axis and Y-axis in the tri-axial gravity sensing element 10 would be turned off, and only the detection of the vertical axis, the Z-axis, is retained (step S23).

When the procedure of the cardiopulmonary resuscitation is started, the operation indication of the cardiopulmonary resuscitation will be issued through the sound output element 30 to prompt the rescuer to perform cardiopulmonary resuscitation on the rescued person, especially the pressing depth, the pressing force, and the pressing frequency of chest compressions (step S24). When the rescuer performs chest compressions on the rescued person, if the pressing depth is greater than the critical value of the pressing depth setting value, such as six centimeters, the result represents that the compression is too deep, and a warning speech will be generated through the sound output element 30 to indicate that the compression is too deep, and at the same time, a pressing depth indication of the cardiopulmonary resuscitation is generated through the visual output element 40 to indicate the rescuer to reduce the depth and force of chest compressions; and if the pressing depth is lower than the critical value of the pressing depth setting value, such as five centimeters, the result represents that the compression is too shallow, and a warning speech will be generated through the sound output element 30 to indicate that the compression is too shallow, and at the same time, a pressing depth indication of the cardiopulmonary resuscitation is generated through the visual output element 40 to indicate the rescuer to increase the depth and force of chest compressions. In a preferred embodiment of the present invention, the visual output element 40 is a group of indicators composed of five light-emitting diodes.

When ambulance staffs reach the position where the rescued person fell, shocked, or fainted (step S25), the rescuer long presses the power button 64 in the portable guidance device for cardiopulmonary resuscitation 1 of the present invention to dismiss all modes, and the portable guidance device for cardiopulmonary resuscitation 1 of the present invention is maintained at a standstill, which is not in the state of the fall detection system nor the cardiopulmonary resuscitation guidance system (step S26).

Figure 3:
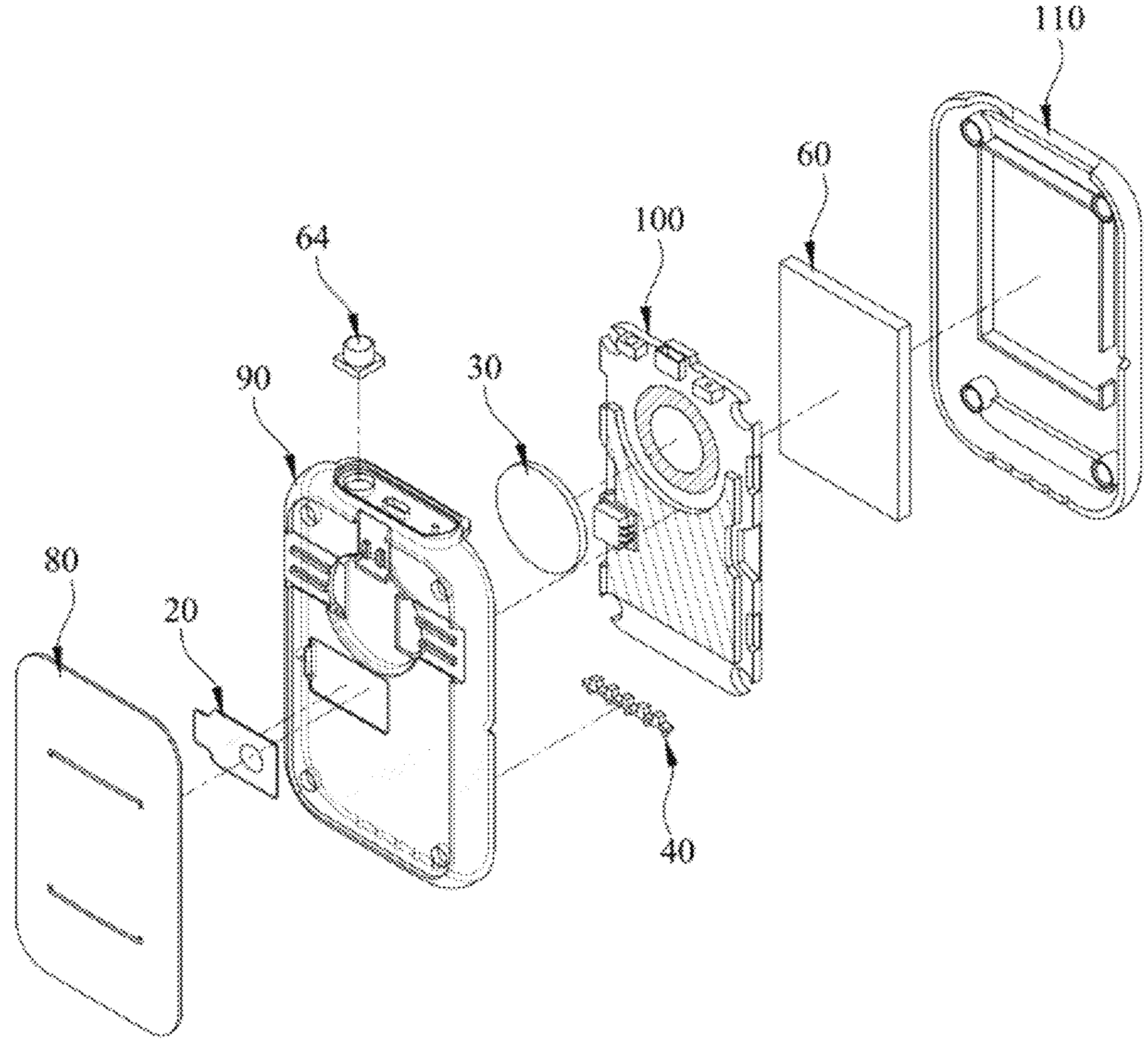
FIG. 3 shows a structural diagram of the portable guidance device for cardiopulmonary resuscitation of the present invention.
Figure 4:
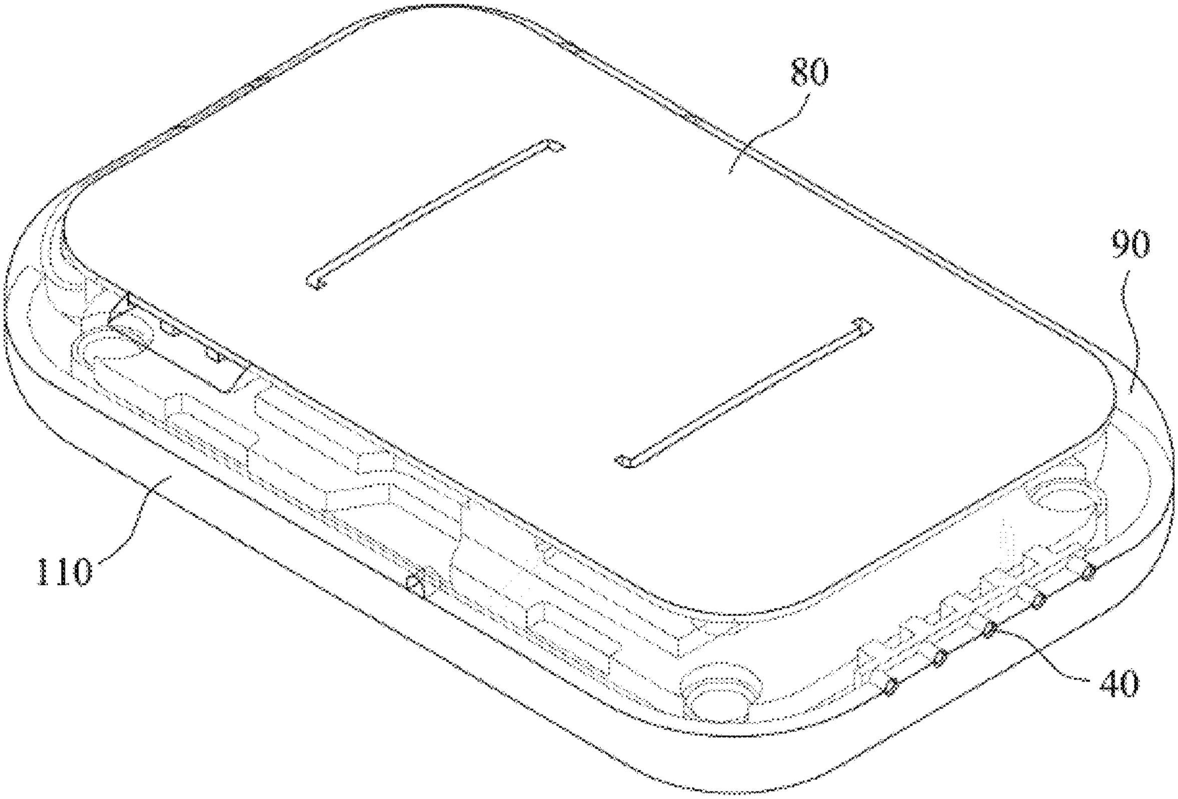
FIG. 4 shows an appearance figure of the portable guidance device for cardiopulmonary resuscitation of the present invention.

Please refer to FIGS. 3 and 4. The length, width, and height of the portable guidance device for cardiopulmonary resuscitation 1 of the present invention can be, but not limited to, 97.4 cm, 62.2 cm, and 19.7 cm, respectively. Thus, the portable guidance device for cardiopulmonary resuscitation 1 of the present invention can be carried for using, especially be placed in the clothing pocket of the rescued person, so as to detect the action state of the wearer at any time.

The appearance structure from top to bottom of the portable guidance device for cardiopulmonary resuscitation 1 of the present invention comprises: a pressing plate cover 80, a pressure sensing element 20, an upper plate cover 90, a main circuit board 100, a power supply 60, and a lower plate cover 110, and the power button 64 is located at the end of the upper plate cover 90, and the sound output element 30 and the visual output element 40 are located at the main circuit board 100. The pressing plate cover 80 has a positioning frame to guide the rescuer to perform chest compression at the correct position. The long axis of the lower plate cover 110 has a convex curve, which can better fit the position where the rescued person is pressed by the chest.

In the portable guidance device for cardiopulmonary resuscitation 1 of the present invention, the sound output element 30 can be, but is not limited to, a loudspeaker, so that when it detects that the rescued person is in a falling action state, a speech alarm is issued, and when the rescuer performs cardiopulmonary resuscitation on the rescued person, a speech indication is issued for the operation of the cardiopulmonary resuscitation. The maximum sound output decibel can be, but not limited to, eight ohms (two watts).

In the portable guidance device for cardiopulmonary resuscitation 1 of the present invention, the visual output element 40 may be, but is not limited to, a light-emitting diode (LED) to show the indications of the pressing depth, the pressing force, and the pressing frequency of the cardiopulmonary resuscitation which the rescuer performed. Thus, the rescuer can more intuitively and clearly understand the appropriate pressing depth, pressing force, and pressing frequency. At the same time, the remaining power of the portable guidance device for cardiopulmonary resuscitation 1 of the present invention can be displayed by the visual output element 40 before entering the procedure of the cardiopulmonary resuscitation.

In the portable guidance device for cardiopulmonary resuscitation 1 of the present invention, the lithium battery 63 can be, but is not limited to, a 1150 mAh lithium ion battery, which can be fully charged within 2.5 hours at the maximum, so that the portable guidance device for cardiopulmonary resuscitation 1 of the present invention maintains a standby time of 20-40 hours. The negative temperature coefficient is used to detect that the lithium battery 63 is charged at a safe temperature, and when the lithium battery 63 is connected to the universal serial bus, the portable guidance device for cardiopulmonary resuscitation 1 of the present invention is forced to shut down for charging.

In the portable guidance device for cardiopulmonary resuscitation 1 of the present invention, the material of the pressing plate cover 80 may be, but not limited to, a rubber, to increase the friction when pressed by the rescuer, and to reduce the error of pressing position caused by displacement during chest compressions.

In the portable guidance device for cardiopulmonary resuscitation 1 of the present invention, the structure that the upper plate cover 90 and the lower plate cover 110 together cover the whole device of the present invention can effectively reduce the influence of static electricity on the portable guidance device for cardiopulmonary resuscitation 1 of the present invention, and can improve the effect of dust and water repellent. The universal serial bus and the sound output element 30 are also included in the protective structure.

The portable guidance device for cardiopulmonary resuscitation 1 of the present invention can detect the action state of the wearer (i.e. the rescued person), and when the action state of a fall occurs, or when the wearer faints or goes into shock, it actively sends out an alarm for help to the surround to prompt others to rescue the rescued person, and at the same time connects to notify the remote rescue system. The portable guidance device for cardiopulmonary resuscitation 1 of the present invention has a pressure sensing element 20 to detect whether the pressing frequency and the pressing force of chest compressions are appropriate, it also cooperates with the tri-axial gravity sensing element 10 to detect the pressing depth of chest compressions, and the two kinds of values are calibrated by the microcontroller 50 with the analog-to-digital converter 51 to generate the pressing strength setting values suitable for the wearers of different body shapes, so in addition to increasing the accuracy of chest compressions in cardiopulmonary resuscitation, the portable guidance device for cardiopulmonary resuscitation 1 of the present invention can automatically adjusted to a mode suitable for different wearers without manual evaluation and adjustment of the parameter setting in the system. Besides, the portable guidance device for cardiopulmonary resuscitation 1 of the present invention uses direct speech indication and visual indication to improve the efficiency and accuracy of chest compressions performed by the rescuer.

Therefore, the portable guidance device for cardiopulmonary resuscitation 1 of the present invention can be used for home care after legal retailing and provide eligible people, families or units for rent, and can be cooperated with relevant acute care policies and comprehensive care plans, etc., and cooperate with local rehabilitation hospitals and clinics, and cooperate with community rehabilitation, home health care and technical care institutions to provide patients in need.

The start of the procedure of the cardiopulmonary resuscitation (step S23) according to an example embodiment of the present invention will be described in further detail below.

When the cardiopulmonary resuscitation procedure is started, the indications of the cardiopulmonary resuscitation operation will be issued through the sound output element 30 (step S24) to prompt the rescuer to perform cardiopulmonary resuscitation on the rescued person, especially the pressing depth, the pressing strength, and the pressing frequency of chest compressions. When the rescuer performs chest compressions on the rescued person, if the pressing depth is greater than the critical value of the pressing depth setting value, i.e. six centimeters, the result represents that the compression is too deep, and a warning speech will be generated through the sound output element 30 to indicate that the compression is too deep, and at the same time, a pressing depth indication of the cardiopulmonary resuscitation is generated through the visual output element 40 to indicate the rescuer to reduce the depth and force of chest compressions; and if the pressing depth is lower than the critical value of the pressing depth setting value, i.e. five centimeters, the result represents that the compression is too shallow, and a warning speech will be generated through the sound output element 30 to indicate that the compression is too shallow, and at the same time, a pressing depth indication of the cardiopulmonary resuscitation is generated through the visual output element 40 to indicate the rescuer to increase the depth and force of chest compressions. The visual output element 40 is a group of indicators composed of five light-emitting diodes.

The tri-axial gravity sensing element 10 in the portable guidance device for cardiopulmonary resuscitation 1 of the present invention is not only a fall detection, but also can calibrate the pressure sensing element 20. For example: if the tri-axial gravity sensing element 10 detects a pressing depth of six centimeters, and the pressure sensing element 20 detects a pressure of approximately 420N, the relative value obtained by the analog-to-digital converter 51 would be 3600 (12 bit); if the tri-axial gravity sensing element 10 detects a pressing depth of five centimeters, and the pressure sensing element 20 detects a pressure of approximately 350N, the relative value converted by the analog-to-digital converter 51 would be 3000 (12 bit); however, if the tri-axial gravity sensing element 10 detects a pressing depth of four centimeters, and the pressure sensing element 20 detects a pressure of approximately 280N, the relative pressure obtained by the analog-to-digital converter 51 would be 2400 (12 bit); wherein, a high-quality chest compression is that the pressing depth of chest compression is between five and six centimeters, and the pressing frequency is 100-120 times per minute.

When the rescuer performs chest compression on the rescued person, the pressure sensing element 20 will simultaneously calculate the pressure generated by the pressing depth, wherein the unit of the pressure is Newton's force, and output a pressure sensing signal to the microcontroller 50. The pressure sensing element 20 may be, but not limited to, a pressure sensor, and the pressure sensor may be, but not limited to, a piezoelectric transducer.

The analog-to-digital converter 51 in the microcontroller 50 converts the pressing depth sensing signal and the pressure sensing signal into an analog-digital value relatively when the pressing depth is between five and six centimeters, and integrates and calibrates the two analog-digital values to generate a pressure force setting value suitable for the rescued person, and at the same time turns off the tri-axial gravity sensing element 10; in this way, the portable guidance device for cardiopulmonary resuscitation 1 of the present invention can be suitable for rescued people of any kinds of body shapes, and in the case of actual chest compressions, the uses of the pressure sensor is easier to detect the pressing strength, and the firmware is also easier to calculate.

When the rescuer continues to perform chest compressions on the rescued person, if the pressure of the compression detected by the pressure sensing element 20 is higher than the pressing strength setting value, the result represents that the compression is too deep, and the speech will be generated through the sound output element 30 to indicate the reduction of the pressing force, and the pressing strength indication of the cardiopulmonary resuscitation is generated through the visual output element 40 to indicate the reduction of the pressing force, so that the pressing force meets the pressing strength setting value; and if the pressing depth is lower than the pressing strength setting value, the result represents that the compression is too shallow, and the speech will be generated through the sound output element 30 to indicate the increase of the pressing force, and the pressing strength indication of the cardiopulmonary resuscitation is generated through the visual output element 40 to indicate the increase of the pressing strength, so that the pressing force meets the pressing strength setting value.

When the rescuer continues to perform chest compressions on the rescued person, if the pressing frequency detected by the metronome in the pressure sensing element 20 is greater than the critical value of the pressing frequency setting value, i.e. 120 compressions per minute, the result represents that the compression is too fast, and the speech will be generated through the sound output element 30 to indicate to slow down the pressing frequency, and the pressing frequency indication of the cardiopulmonary resuscitation is generated through the visual output element 40 to indicate to slow down the pressing frequency, so that the pressing frequency meets the pressing frequency setting value; and if the pressing frequency is lower than the critical value of the pressing frequency setting value, i.e. 100 compressions per minute, the result represents that the compression is too slow, and the speech will be generated through the sound output element 30 to indicate to accelerate the pressing frequency, and the pressing frequency indication of the cardiopulmonary resuscitation is generated through the visual output element 40 to indicate to accelerate the pressing frequency, so that the pressing frequency meets the pressing frequency setting value.

In summary, the portable guidance device for cardiopulmonary resuscitation of the present invention can detect the action state of the wearer (i.e. the person who needs to be rescued); and when the action state of a fall occurs, or when the wearer faints or goes into shock, the portable guidance device for cardiopulmonary resuscitation actively sends out an alarm for help to the surround to prompt others to rescue the wearer, and at the same time connects to notify the remote rescue system; the portable guidance device for cardiopulmonary resuscitation of the present invention comprises a pressure sensing element to detect whether the pressing frequency and the pressing force of chest compressions are appropriate, it also cooperates with a tri-axial gravity sensing element to detect a pressing depth of chest compressions, and the two kinds of values are calibrated by a microcontroller with an analog-to-digital converter to generate pressing strength setting values suitable for wearers of different body shapes. Thus, in addition to increasing the accuracy of chest compressions in cardiopulmonary resuscitation, the portable guidance device for cardiopulmonary resuscitation 1 of the present invention can be automatically adjusted to a mode suitable for different wearers without manual evaluation and adjustment of the parameter setting in the system. Besides, the portable guidance device for cardiopulmonary resuscitation of the present invention uses direct speech indication and visual indication to improve the efficiency and accuracy of chest compressions performed by the rescuer.

Therefore, the portable guidance device for cardiopulmonary resuscitation of the present invention can be used for home care after legal retailing and provide eligible people, families or units for rent, and can be cooperated with relevant acute care policies and comprehensive care plans, etc., and cooperate with local rehabilitation hospitals and clinics, and cooperate with community rehabilitation, home health care and technical care institutions to provide patients in need.

What is claimed is:

1. A portable guidance device for cardiopulmonary resuscitation, comprising:

a tri-axial gravity sensing element, which is configured to be worn on an individual to detect the tri-axial action state of the individual and output a gravity sensing signal;

a pressure sensing element, configured to sense a pressing force and configured to output a pressure sensing signal;

a sound output element, configured to generate a speech;

a visual output element, configured to generate a pressing depth indication or a pressing strength indication; and a microcontroller, configured to receive the gravity sensing signal and the pressure sensing signal;

wherein, the microcontroller is configured to determine whether the individual has fallen based on the gravity sensing signal, and the microcontroller causes the sound output element to generate the speech for indicating a procedure of cardiopulmonary resuscitation;

wherein, the microcontroller determines whether the pressing force matches a pressing setting based on the gravity sensing signal and the pressure sensing signal, and the microcontroller causes the visual output element response to the pressing force to generate the pressing depth indication or the pressing strength indication, and causes the sound output element response to the pressing force to generate a speech indication to meet the pressing setting in the procedure of the cardiopulmonary resuscitation, wherein the pressing setting comprises a pressing depth setting value, a pressing strength setting value, and a pressing frequency setting value, wherein in the procedure of the cardiopulmonary resuscitation, the tri-axial gravity sensing element only retains the gravity sensing signal of the vertical axis defined as the Z axis, to detect a pressing depth and generate a pressing depth sensing signal, which is received by the microcontroller and used to determine whether the pressing depth meets the pressing depth setting value, and wherein the microcontroller further comprises an analog-to-digital converter, and the analog-to-digital converter converts the pressing depth sensing signal and the pressure sensing signal into an analog-digital value, respectively, and integrates and calibrate the two analog-digital values to generate a pressing strength setting value suitable for the individual, and at the same time turns off the tri-axial gravity sensing element when the pressing depth meets the pressing depth setting value.

2. The portable guidance device for cardiopulmonary resuscitation according to claim 1, wherein the sound output element is configured to generate the speech to indicate a decrease in the pressing depth, and the visual output element is configured to generate the pressing depth indication of the cardiopulmonary resuscitation when the pressing depth sensing signal is greater than the pressing depth setting value, so that the pressing depth meets the pressing depth setting value; and the sound output element is configured to generate the speech to indicate an increase in the pressing depth, and the visual output element is configured to generate the pressing depth indication of the cardiopulmonary resuscitation when the pressing depth sensing signal is lower than the pressing depth setting value, so that the pressing depth meets the pressing depth setting value.

3. The portable guidance device for cardiopulmonary resuscitation according to claim 1, wherein the sound output element is configured to generate the speech to indicate a decrease in the pressing force, and the visual output element is configured to generate the pressing strength indication of the cardiopulmonary resuscitation when the pressing force is greater than the pressing strength setting value, so that the pressing force meets the pressing strength setting value; and the sound output element is configured to generate the speech to indicate an increase in the pressing force, and the visual output element is configured to generate the pressing strength indication of the cardiopulmonary resuscitation when the pressing force is lower than the pressing strength setting value, so that the pressing force meets the pressing strength setting value.

4. The portable guidance device for cardiopulmonary resuscitation according to claim 1, wherein the pressure sensing element further comprises a metronome configured to detect the pressing frequency and configured to generate a pressing frequency sensing signal, which is received by the microcontroller and used to determine whether the pressing frequency meets the pressing frequency setting value.

5. The portable guidance device for cardiopulmonary resuscitation according to claim 4, wherein the sound output element is configured to generate the speech to indicate a decrease in the pressing frequency, and the visual output element is configured to generate the pressing frequency indication of the cardiopulmonary resuscitation when the pressing frequency is greater than the pressing frequency setting value, so that the pressing frequency meets the pressing frequency setting value; and the sound output element is configured to generate the speech to indicate an increase in the pressing frequency, and the visual output element is configured to generate the pressing frequency indication of the cardiopulmonary resuscitation when the pressing frequency is lower than the pressing frequency setting value, so that the pressing frequency meets the pressing frequency setting value.

6. The portable guidance device for cardiopulmonary resuscitation according to claim 1, wherein the pressure sensing element further comprises a variable resistor configured to calibrate and fine-tune an error which occurs when the pressing force is converted into the pressure sensing signal.

7. The portable guidance device for cardiopulmonary resuscitation according to claim 1, wherein the tri-axial gravity sensing element is a gravity sensor; the pressure sensing element is a piezoelectric transducer.

8. The portable guidance device for cardiopulmonary resuscitation according to claim 1, wherein the visual output element is a combination of light emitting diodes.

9. The portable guidance device for cardiopulmonary resuscitation according to claim 1, wherein the sound output element includes a speech generator, a loudspeaker, and a broadcaster.

10. The portable guidance device for cardiopulmonary resuscitation according to claim 1, wherein the portable guidance device for cardiopulmonary resuscitation further comprises a power supply.

11. The portable guidance device for cardiopulmonary resuscitation according to claim 10, wherein the power supply includes a charging port, a lithium charger, a lithium battery, and a power button.

12. The portable guidance device for cardiopulmonary resuscitation according to claim 11, wherein the lithium battery further comprises a temperature sensor.

13. The portable guidance device for cardiopulmonary resuscitation according to claim 1, wherein the portable guidance device for cardiopulmonary resuscitation further comprises a pressing plate cover, an upper plate cover, a main circuit board and a lower plate cover, wherein the sound output element and the visual output element are located in the main circuit board, and the pressing plate cover has a positioning frame.

14. A guidance method for cardiopulmonary resuscitation, which uses a portable guidance device for cardiopulmonary resuscitation, which comprising: a tri-axial gravity sensing element, a pressure sensing element and a sound output element, and the guidance method comprises steps:

causing the sound output element to generate a speech to guide a procedure of cardiopulmonary resuscitation when a fall occurring in an individual wearing the portable guidance device for cardiopulmonary resuscitation is determined based on a gravity sensing signal of the tri-axial gravity sensing element, and the procedure of cardiopulmonary resuscitation includes placing the portable guidance device for cardiopulmonary resuscitation on the chest of the individual lying flat, and applying a pressing force on the portable guidance device for cardiopulmonary resuscitation;

determining whether the pressing force meets a pressing depth setting value based on the gravity sensing signal, and then the sound output element generates a speech to indicate the pressing depth indication, so that the pressing force meets the pressing depth setting value;

determining whether the pressing force meets a pressing strength setting value based on a pressure sensing signal of the pressure sensing element, and then the sound output element generates a speech to indicate the pressing strength indication, so that the pressing force meets the pressing strength setting value; and determining whether a frequency of the pressing force meets the pressing frequency setting value based on a pressing frequency sensing signal of the pressure sensing element, and then the sound output element generates a speech to indicate the pressing frequency indication, so that the frequency of the pressing force meets the pressing frequency setting value, wherein in the procedure of the cardiopulmonary resuscitation, the tri-axial gravity sensing element only retains the gravity sensing signal of the vertical axis defined as the Z axis, to detect a pressing depth, and wherein the tri-axial gravity sensing element is turned off when the pressing depth meets the pressing depth setting value.

* * * * *